Patented Feb. 6, 1940

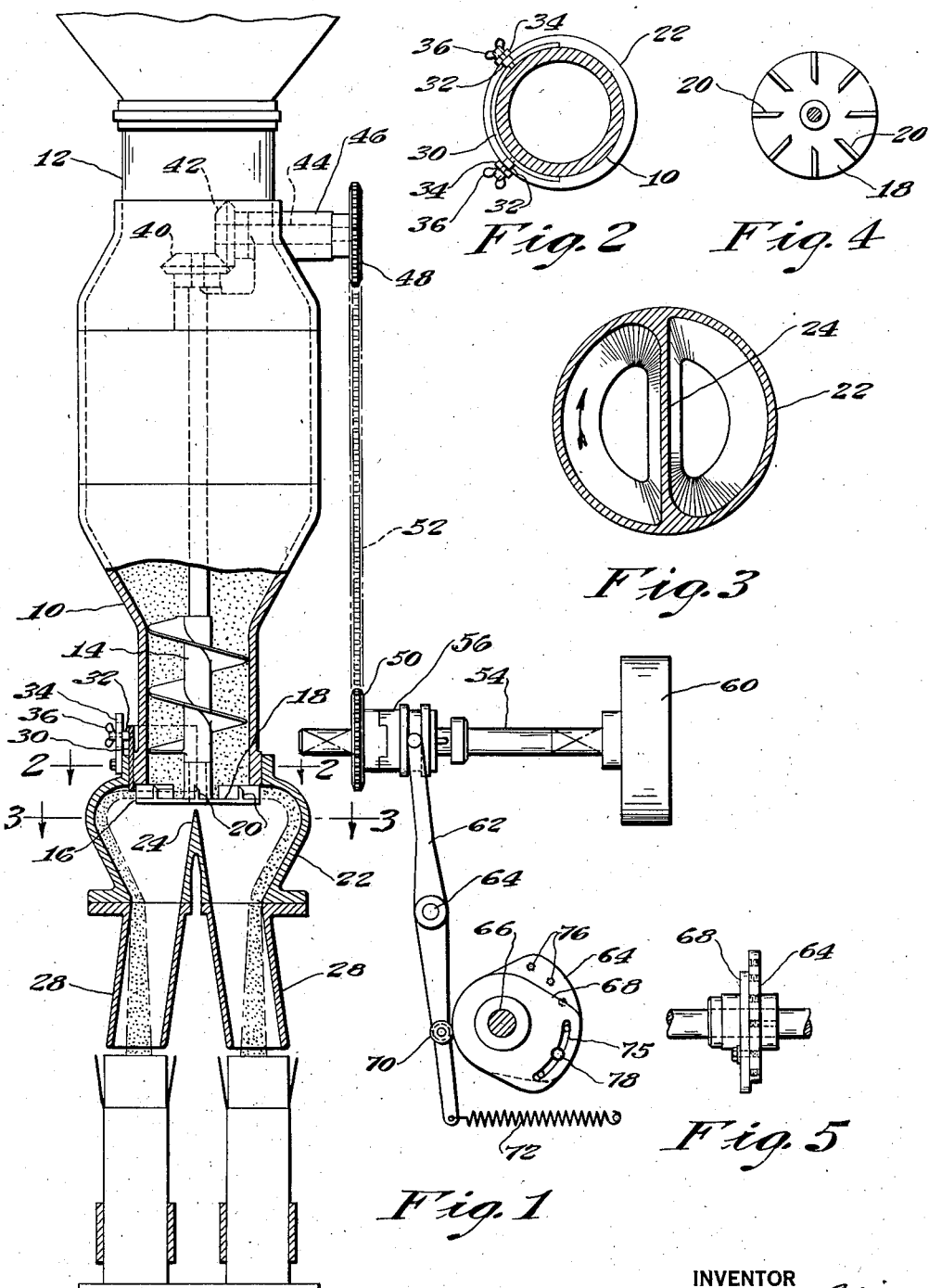

2,189,018

UNITED STATES PATENT OFFICE 2,189,018

FILLING APPARATUS

George A. Robinson, Milton, Mass., assignor to Pneumatic Scale Corporation, Limited, Quincy, Mass., a corporation of Massachusetts Application January 30, 1937, Serial No. 123,262

3 Claims. (Cl. 221—130)

This invention relates to filling apparatus, and more particularly to filling apparatus for delivering flowable solid material into packages or cartons.

The object of the invention is to provide a novel and improved filling apparatus in which provision is made for dividing and distributing a stream of flowable solid material in a substantially uniform manner to form therefrom a plurality of uniform streams of such material to the end that a plurality of packages or other receptacles may be filled with substantially equal volumes of material during the operation of the apparatus through any predetermined interval of time.

With this general object in view, and such others as may hereinafter appear, the invention consists in the filling apparatus and in the various structures, arrangements, and combinations of parts hereinafter described and particularly defined in the claims at the end of this specification.

In the drawing, illustrating the preferred embodiment of the invention, Fig. 1 is a longitudinal view, partly in cross section illustrating the essentials of the present filling apparatus; Fig. 2 is a section on the line 2—2 of Fig. 1; Fig. 3 is a section on the line 3—3 of Fig. 1; Fig. 4 is a plan view of a detail to be referred to; and Fig. 5 is a side elevation of a portion of the apparatus shown in Fig. 1.

In general, the present invention contemplates a construction of filling apparatus in which provision is made for causing a stream of flowable solid material to flow in a substantially uniform manner. Provision is made for sub-dividing the stream of material thus fed into a plurality of smaller but uniform streams, and for delivering such smaller streams into individual packages, cartons, or other receptacles, whereby during the operation of the apparatus through a definite interval of time a plurality of packages, cartons or other receptacles may be economically filled with substantially equal volumes of the material. In its preferred form the apparatus contemplates the provision of a worm for feeding the main stream of material; and the provision of a distributing member for distributing the material delivered by the worm uniformly into a plurality of compartments through which the individual streams are delivered to packages, cartons, or other receptacles disposed beneath the same. The apparatus contemplates mechanism for initiating and discontinuing the operation of the feed worm and distributing device.

Referring now to the drawing, the filling apparatus illustrated therein is provided with a hopper casing 10 and a feed worm 14 designed to feed the material through the hopper at a substantially uniform rate of flow. The hopper 10 is supplied with the material from any usual source of supply through a supply tube 12. The worm 14, rotatably mounted within the hopper 10, is provided at its lower end with a distributing device, herein shown as a disk 16 which is secured thereto and rotatable therewith. The distributing disk 16 comprises a flat plate 18 provided with a plurality of narrow upstanding vanes 20 radially arranged thereon. The lower end of the hopper 10 is provided with an annular funnel shaped casing 22 suitably secured thereto. As the material is centrifugally expelled from the disk 16 it is guided through the casing 22 which is shaped at its upper end to offer the least resistance to the natural flow of the material.

As herein shown, the casing 22 is divided into two sections by a transversely extended dividing member 24. In its preferred form, the upper portion of the outer wall of the casing 22 is shaped to present a smoothly curved interior surface and to eliminate any sharp corners, into which the material might be liable to pack or jam, and as illustrated, see Fig. 3, the curvature of such upper portion of the casing is preferably on a large radius so that the force of the material distributed by the disk 16 is directed against such curved surfaces causing the stream of material being delivered by the worm to be divided in a most uniform and even manner. After passing through the casing 22 the material is discharged through discharge spouts 28 and introduced into the cartons placed beneath them. The cartons may be positioned by hand or by a suitable conveyor, not shown.

In order to assure a uniform distribution of the material delivered by the disk 16 so that each carton may receive a substantially equal volume of material, an adjustment is provided to permit the distribution of the material to be varied. This adjustment is provided for one compartment only as it has been found in practice that any variation in the feeding of the material by the worm will be uniformly constant, hence the single adjustment usually serves to equalize the flow of the material into the different compartments. As herein shown, the adjustment is accomplished by raising or lowering a semi-circular and vertically disposed plate 30, which is slidably fitted into a grooved portion of the casing 22. The plate is provided with studs 32 which extend into slotted supporting members 34. The extended ends of the studs are provided with wing nuts 36 which may be tightened to retain the plate 30 in its adjusted position. As illustrated in Figs. 1 and 2, when the plate is lowered it will reduce the aperture through which the material is centrifugally expelled from the disk 16 on one side. In operation, if it is found that it is desirable to provide the adjustment at a different position, it will be seen that the casing 22 may be revolved to present the adjustment in the desired position.

In addition to its function as a centrifugal distributor, the disk 16 serves to retain the material at the mouth of the hopper 10 when the feed worm 14 is stopped. In the usual worm feed hopper, when the worm is stopped, the material at the mouth of the hopper below the worm would naturally fall by gravity into the packages beneath. In the present case, this would cause an uneven distribution, as the volume of material below the worm would be greater on one side than on the other on account of the pitch of the feed worm. The radial vanes also serve to disintegrate the material which may have become tightly packed together by the feed worm.

Provision is made for driving the feed worm 14 and for stopping and starting the worm at predetermined intervals in the operation of the apparatus and as herein shown, the upper end of the worm is provided with a bevel gear 40 which meshes with a bevel gear 42 secured to a short shaft 44. The shaft 44, journaled in a bearing 46 extended from the hopper 10, is provided at its outer end with a sprocket 48 which is connected to a sprocket 50 by a chain 52. The sprocket 50, loosely mounted on a drive shaft 54 forms the driven member of a clutch, the driving member 56 being slidably secured to the shaft 54. The shaft 54 may be driven through any usual or preferred means, as by an electric motor, not shown, belted to a pulley 60 secured to the shaft 54. The driving member 56 of the clutch is arranged to be shifted by a lever 62, pivoted at 64 and actuated by an adjustable cam, one member 64 being keyed to the cam shaft 66 and the other member 68 loosely mounted on the shaft and adjustably secured to the fixed member 64. The cam cooperates with a cam roll 70 mounted in the lower arm of the lever 62 and the clutch is normally urged into engaging position by a spring 72 while the cam serves to throw the clutch out. Adjustment of the cam, to vary the length of time in which the clutch is engaged and consequently the duration of the feeding time, is accomplished by sliding the loosely mounted member 68 of the cam around and aligning the slot 75 with one of the series of holes 76 provided in the fixed member 64 and tightening the bolt 78 in the desired position.

While the worm 14 and distributing disk 16 have been herein illustrated and described for the purpose of feeding and distributing the main stream of material being fed, nevertheless it is not desired to limit the invention in this respect as viewed in its broader aspects certain features of the invention may be used with advantage with other types of feeding distributing devices, and in some instances in gravity feed filling apparatus.

While the preferred embodiment of the invention has been herein illustrated and described, it will be understood that the invention may be embodied in other forms within the scope of the following claims.

Having thus described the invention what is claimed is:

1. In a filling apparatus of the character described, in combination, a casing, material feeding means within the casing for feeding a main stream of material therethrough, a cylindrical chamber disposed at the mouth of said casing and having the interior of its outer walls smoothly curved, a centrifugal distributing member for directing the material from the mouth of said casing against said curved walls, said enlarged chamber having partitioning means for separating the chamber into equal sections whereby to permit the chamber to subdivide the material into smaller but uniform streams, and means for restricting the flow of material from one portion of said distributing member whereby to adjust the flow into one section.

2. In a filling apparatus of the character described, in combination, a casing, material feeding means within the casing for feeding a main stream of material therethrough, a cylindrical chamber disposed at the mouth of said casing and having the interior of its outer walls smoothly curved, a centrifugal distributing member for directing the material from the mouth of said casing against said curved walls, said enlarged chamber having partitioning means for separating the chamber into equal sections whereby to permit the chamber to subdivide the material into smaller but uniform streams, and means for adjustably restricting the space between the wall of said chamber and the periphery of said distributing member whereby to permit adjustment of the flow of material from the distributing member into one section, said chamber being adapted to be rotatably adjusted with relation to said casing and to said flow restricting means.

3. In a filling apparatus of the character described, in combination, a casing, material feeding means within the casing for feeding a main stream of material therethrough, a chamber surrounding the mouth of the casing and depending therefrom, a centrifugal distributing member disposed immediately below the mouth of the casing and within the upper part of said chamber, the interior walls of said chamber extending outwardly from the mouth of the casing above said distributing member and spaced a short distance therefrom and being smoothly curved downwardly in a generally tapering conical shape whereby as the material is thrown outwardly by said distributing member, minimum resistance is offered to its downward flow along said smoothly curved walls.

GEORGE A. ROBINSON.